United States Patent
Hsu et al.

(10) Patent No.: US 10,044,491 B2
(45) Date of Patent: Aug. 7, 2018

(54) DATA TRANSMISSION METHOD FOR PERFORMING FULL-DUPLEX COMMUNICATIONS AND BASE STATION USING THE SAME

(71) Applicant: INDUSTRIAL TECHNOLOGY RESEARCH INSTITUTE, Hsinchu (TW)

(72) Inventors: Kai-Cheng Hsu, New Taipei (TW); Hung-Yu Wei, Taipei (TW); Ching-Ju Lin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 85 days.

(21) Appl. No.: 15/210,839

(22) Filed: Jul. 14, 2016

(65) Prior Publication Data
US 2017/0264418 A1 Sep. 14, 2017

Related U.S. Application Data

(60) Provisional application No. 62/307,620, filed on Mar. 14, 2016.

(51) Int. Cl.
*H04W 72/12* (2009.01)
*H04L 5/14* (2006.01)
(Continued)

(52) U.S. Cl.
CPC ............. *H04L 5/14* (2013.01); *H04B 17/309* (2015.01); *H04B 17/336* (2015.01);
(Continued)

(58) Field of Classification Search
CPC ...... H04L 5/14; H04L 5/0048; H04W 52/367; H04W 52/243; H04B 17/309; H04B 17/336
See application file for complete search history.

(56) References Cited

U.S. PATENT DOCUMENTS 8,089,907 B2 1/2012 Pannell et al.
2004/0131025 A1* 7/2004 Dohler ................ H04B 7/2606
370/328
(Continued)

FOREIGN PATENT DOCUMENTS

CN 1247437 A 3/2000
CN 101043399 A 9/2007
(Continued)

OTHER PUBLICATIONS

"3rd Generation Partnership Project; Technical Specification Group Radio Access Network; Study on Network-Assisted Interference Cancellation and Suppression (NAIC) for LTE (Release 12)", 3GPP TR 36.866 V12.0.1, 2014.
(Continued)

Primary Examiner — Jay P Patel
(74) Attorney, Agent, or Firm — Rabin & Berdo, P.C.

(57) ABSTRACT

In an embodiment, a base station (BS) receives one or more first data transmitting from at least one of one or more transmitting user equipments (UEs). The BS transmits a message including assistance parameters for performing a full-duplex data transmission, to at least one of one or more receiving UEs, wherein the parameters are associated with information of reducing an interference from the at least one of the transmitting UEs. And, the BS transmits one or more second data including the one or more first data to the at least one of the receiving UEs. Wherein, the receiving UEs and the transmitting UEs respectively include at least one of: one or more half-duplex UEs, one or more full-duplex UEs, or any combination of two or more of the half-duplex UEs and the full-duplex UEs.

22 Claims, 7 Drawing Sheets

(51) Int. Cl.
  *H04B 17/336* (2015.01)
  *H04W 52/24* (2009.01)
  *H04B 17/309* (2015.01)
  *H04L 5/00* (2006.01)
  *H04W 52/36* (2009.01)

(52) U.S. Cl.
  CPC ......... *H04L 5/0048* (2013.01); *H04W 52/243* (2013.01); *H04W 52/367* (2013.01)

(56) References Cited

U.S. PATENT DOCUMENTS

| | | | |
|---|---|---|---|
| 2007/0064829 | A1 | 3/2007 | Zheng et al. |
| 2009/0067354 | A1 | 3/2009 | Gao et al. |
| 2011/0299417 | A1 | 12/2011 | Nanda et al. |
| 2012/0076173 | A1 | 3/2012 | Chang et al. |
| 2012/0230247 | A1 | 9/2012 | Kwon et al. |
| 2013/0242814 | A1 | 9/2013 | Wang et al. |
| 2014/0185479 | A1 | 7/2014 | Lee |
| 2014/0226538 | A1 | 8/2014 | Wang et al. |
| 2015/0029906 | A1 | 1/2015 | Jana et al. |
| 2015/0078177 | A1 | 3/2015 | Buckley et al. |
| 2015/0223173 | A1 | 8/2015 | Khojastepour et al. |
| 2016/0029404 | A1 | 1/2016 | Aryafar et al. |
| 2017/0041121 | A1* | 2/2017 | Noh .................. H04W 52/325 |
| 2017/0078971 | A1* | 3/2017 | Noh .................. H04W 88/08 |

FOREIGN PATENT DOCUMENTS

| | | |
|---|---|---|
| CN | 102405681 B | 6/2015 |
| TW | 201101906 A | 1/2011 |
| TW | I478535 B | 3/2015 |
| TW | 201547220 A | 12/2015 |
| TW | 201607266 A | 2/2016 |

OTHER PUBLICATIONS

Sanjay Goyal et al., "Improving Small Cell Capacity with Common-Carrier Full Duplex Radios", 2014 IEEE International Conference on Communications (ICC), pp. 4987-4993, Jun. 2014.

Karthikeyan Sundaresan et al., "Full-Duplex without Strings: Enabling Full-Duplex with Half-Duplex Clients", Proceedings of the 20th annual international conference on Mobile computing and networking, ACM 978-1-4503-2783—Jan. 14, 2009, pp. 55-66, Sep. 2014.

Ehsan Aryafar et al., "FD2: A Directional Full Duplex Communication System for Indoor Wireless Networks", 2015 IEEE Conference on Computer Communications (INFOCOM), pp. 1993-2001, May 2015.

Jingwen Bai et al., "Distributed Full-duplex via Wireless Side-Channels: Bounds and Protocols", IEEE Transactions on Wireless Communications (vol. 12, Issue 8), pp. 4162-4173, Jul. 30, 2013.

Li Li et al., "Non-Coherent Successive Relaying and Cooperation: Principles, Designs, and Applications", IEEE Communications Surveys & Tutorials (vol. 17, Issue 3), pp. 1708-1737, Apr. 17, 2015.

Elaheh Askari et al., "Single-band full-duplex MAC protocol for distributed access networks", IET Communications (vol. 8, Issue: 10), pp. 1663-1673, Jul. 3, 2014.

Aimin Tang et al., "A-Duplex: Medium Access Control for Efficient Coexistence Between Full-Duplex and Half-Duplex Communications", IEEE Transactions on Wireless Communications (vol. 14, Issue: 10), pp. 5871-5885, Jun. 12, 2015.

Dinesh Bharadia et al., "FastForward: Fast and Constructive Full Duplex Relays", Proceedings of the 2014 ACM conference on SIGCOMM, pp. 199-210, Aug. 17, 2014.

Taiwanese Office Action dated Sep. 12, 2017.
Taiwanese Office Action dated Nov. 21, 2017.

* cited by examiner wherein for said processing type is the IN-type transmission, the SINR of each of the one or more transmitting UEs and the SINR of each of the one or more receiving UEs are respectively based on a channel strength of each of the transmitting UEs, a transmission power of each of the one or more transmitting UEs and the power control factor of each of the one or more transmitting UEs, and the SINR of each of the one or more receiving UEs is further based on a processing matrix of a signal phase and amplitude control, the channel strength of each of the one or more receiving UEs, the channel strength between each of the one or more transmitting UEs and each of the one or more receiving UEs, and a transmission power of the BS ⟋ 901 wherein for said processing type is the SIC-type transmission, the SINR of said one of the one or more transmitting UEs and the SINR of each of the one or more receiving UEs are respectively based on a channel strength of each of the one or more transmitting UEs, a channel strength of each of the one or more receiving UEs, a channel strength between each of the one or more transmitting UEs and each of the one or more receiving UEs, and a transmission power of each of the one or more transmitting UEs ⟋ 903

Fig. 9

DATA TRANSMISSION METHOD FOR PERFORMING FULL-DUPLEX COMMUNICATIONS AND BASE STATION USING THE SAME

CROSS-REFERENCE TO RELATED APPLICATION

This non-provisional application claims priority under 35 U.S.C. § 119(e) of a U.S. Provisional Application No. 62/307,620 filed on Mar. 14, 2016, the entirety of which is incorporated herein by reference.

TECHNICAL FIELD

The technical field relates to a data transmission method for performing full-duplex communications and a base station using the same.

BACKGROUND

The full-duplex communication is not a new issue, but why the current wireless networks are still half-duplex channel link, Time Division Duplex (TDD) or Frequency Division Duplex (FDD), is that because there may be a lack of feasible solutions in hardware for wireless full-duplex radio in the past. However, some research groups start and succeed to propose feasible solution and design a real full-duplex radio system in recent years.

Nowadays, the frequency band below 5 GHz has become extremely scarce, so improving spectrum efficiency or finding new frequency band is needed gradually for future wireless networks. Current wireless networks are often operating on the TDD system or the FDD system because a base station (BS) may only transmit or receive at one time and at same frequency band. When operating in a TDD system, both the transmitter and the receiver use the same frequency but transmitting operation and receiving operation are switched by time. While operating in a FDD system, two different radio frequencies are used for transmitting operation and receiving operation respectively. With the full-duplex capability, the BS can simultaneously serve an uplink client (transmitting end) and a downlink client (receiving end) at the same time and at the same frequency band, so the full-duplex networks may have the potential to double spectrum efficiency theoretically.

However, different from half-duplex networks/communication systems, a base station operating in full-duplex networks has now to serve uplink and downlink client(s) simultaneously. When a base station serves an uplink and a downlink client simultaneously, the uplink client (transmitting end) will interfere with the downlink client (receiving end). If the interference is slight, it might be still possible for the downlink client to decode its data and extract the full-duplex gain. However, if the interference is heavy, it becomes harder for the downlink client to decode its data and the full-duplex gain might be limited or even no gain could be delivered.

Therefore, it is becoming a design consideration on how to perform a data transmission for full-duplex communications in the current wireless networks or future wireless networks.

SUMMARY

Exemplary embodiments in accordance with the application provide a base station and a data transmission method for performing full-duplex communications.

An exemplary embodiment provides a data transmission method for performing full-duplex communications. In this exemplary embodiment of the method, a base station (BS) receives one or more first data transmitting from at least one of one or more transmitting user equipments (UEs). The BS transmits a message including a plurality of assistance parameters for performing a full-duplex data transmission, to at least one of one or more receiving UEs; wherein the plurality of assistance parameters are associated with information of reducing an interference from the at least one of the one or more transmitting UEs. And the BS transmits one or more second data including the one or more first data to the at least one of the one or more receiving UEs. Wherein, the one or more receiving UEs and the one or more transmitting UEs respectively comprise at least one of: one or more half-duplex UEs, one or more full-duplex UEs, or any combination of two or more of the one or more half-duplex UEs and the one or more full-duplex UEs.

Another exemplary embodiment provides a base station (BS) for performing full-duplex communications. The BS includes a transceiver unit and a processor coupled to the transceiver unit. The transceiver unit includes one or more antennas, and the transceiver unit is configured for transmitting and receiving. The processor is configured to receive, via the transceiver unit, one or more first data transmitting from at least one of one or more transmitting user equipments (UEs). The processor is configured to transmit, via the transceiver unit, a message comprising a plurality of assistance parameters for performing a full-duplex data transmission, to at least one of one or more receiving UEs; wherein the plurality of assistance parameters are associated with information of reducing an interference from at least one of the one or more transmitting UEs. And the processor is configured to transmit, via the transceiver unit, one or more second data including the one or more first data to the at least one of the one or more receiving UEs. Wherein, the one or more receiving UEs and the one or more transmitting UEs respectively comprise at least one of: one or more half-duplex UEs, one or more full-duplex UEs, or any combination of two or more of the one or more half-duplex UEs and the one or more full-duplex UEs.

The foregoing will become better understood from a careful reading of a detailed description provided herein below with appropriate reference to the accompanying drawings.

BRIEF DESCRIPTION OF THE DRAWINGS

FIG. 9 shows more operating flows of a data transmission method for performing full-duplex communications in accordance with more exemplary embodiments of the application.

DETAILED DESCRIPTION OF THE EXEMPLARY EMBODIMENTS

Figure 1:
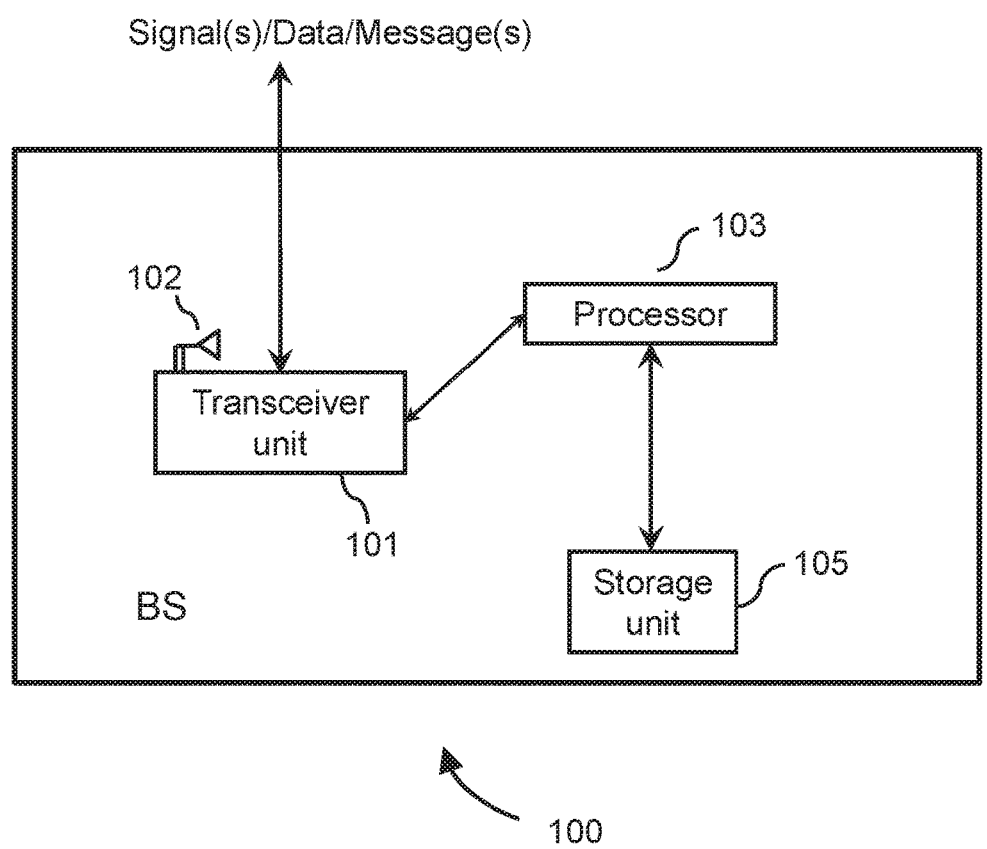
FIG. 1 shows a schematic diagram of a base station (BS) for performing full-duplex communications in accordance with an exemplary embodiment of the application.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosure will demonstrate the exemplary embodiments of a data transmission method for performing full-duplex communications and a base station using the same. A user equipment (UE) may be any electronic device that can perform the operations describing the exemplary embodiments of the application. For example, a user equipment may include, but not limited to a portable phone, a smart phone, a personal digital assistant (PDA), a mobile phone, a satellite phone, a wireless phone, a handheld device/mobile device capable of wireless communication, a portable multimedia player (PMP), and a processing device coupled to a wireless MODEM. Furthermore, the user equipment may include a system, a device, a user device, and a communication device, a subscriber unit, a mobile unit, a mobile terminal, a remote terminal, an access terminal, a user terminal, a terminal a subscriber station, and a remote station. The application, however, is not limited thereto, and other types of user equipment, such as any type of laptop personal computers and other computing devices may operatively incorporate in embodiments of the application.

The full-duplex technique enables a node to transmit and receive at same time and at same frequency band. A full-duplex base station (BS) in cellular networks may receive uplink data from a client and transmit downlink data to a client simultaneously. However, simultaneous uplink and downlink transmission may make additional uplink-to-downlink interference. Because the uplink receiving and the downlink transmitting occur at same time and at same frequency band, the downlink client may also receive the data from the uplink client leading to the interference.

Exemplary embodiments of a data transmission method for performing full-duplex communications and a base station using the same are disclosed herein. FIG. 1 shows a schematic diagram of a base station (BS) 100 for performing full-duplex communications in accordance with an exemplary embodiment of the application. In the embodiment, the BS 100 comprises a transceiver unit 101, a processor 103 and a storage unit 105. The transceiver unit 101 comprises one or more antennas 102, and is configured for transmitting and receiving. The processor 103 is operatively coupled to the transceiver unit 101 and the storage unit 105. The BS 100 may serve at least one pair of uplink transmitting UE and downlink receiving UE simultaneously. The BS 100 is a full-duplex base station, which has the self-interference cancellation capability to enable transmission and receiving in the same frequency at the same time. The UEs those could be served by the BS 100 may be all half-duplex UEs, all full-duplex UEs, or the combination of half-duplex UE(s) and full-duplex UE(s). A full-duplex UE is a UE having the ability to perform full-duplex communications and a half-duplex UE is a UE only having the ability to perform half-duplex communications.

Figure 2:
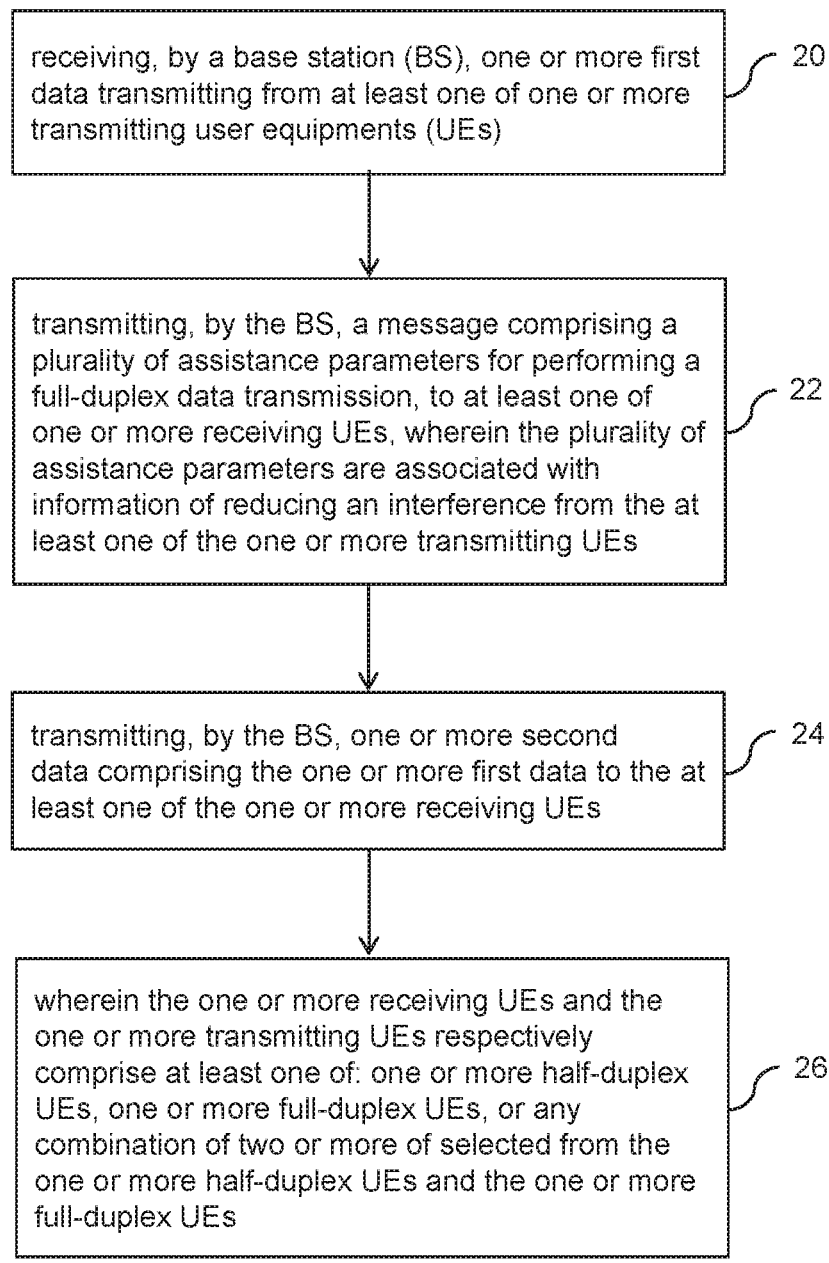
FIG. 2 shows an operating flow of a data transmission method for performing full-duplex communications in accordance with an exemplary embodiment of the application.

As shown in FIG. 2, an operating flow of the data transmission method for performing full-duplex communications in accordance with an exemplary embodiment of the application is disclosed. Refer to the block 20, in this exemplary embodiment of the data transmission method, a base station (BS 100) receives one or more first data transmitting from at least one of one or more transmitting user equipments (UEs). As shown in block 22, the BS 100 transmits a message comprising a plurality of assistance parameters for performing a full-duplex data transmission, to at least one of one or more receiving UEs, wherein the plurality of assistance parameters are associated with information of reducing an interference from the at least one of the one or more transmitting UEs. And in block 24 of FIG. 2, the BS 100 transmits one or more second data comprising the one or more first data to the at least one of the one or more receiving UEs. Wherein the one or more receiving UEs and the one or more transmitting UEs respectively comprise at least one of: one or more half-duplex UEs, one or more full-duplex UEs, or any combination of two or more of the one or more half-duplex UEs and the one or more full-duplex UEs (block 26 of FIG. 2).

In an embodiment, the processor 103 of the BS 100 is configured to receive the one or more first data, transmit the message comprising a plurality of assistance parameters and transmit the one or more second data via the transceiver unit 101.

Figure 3:
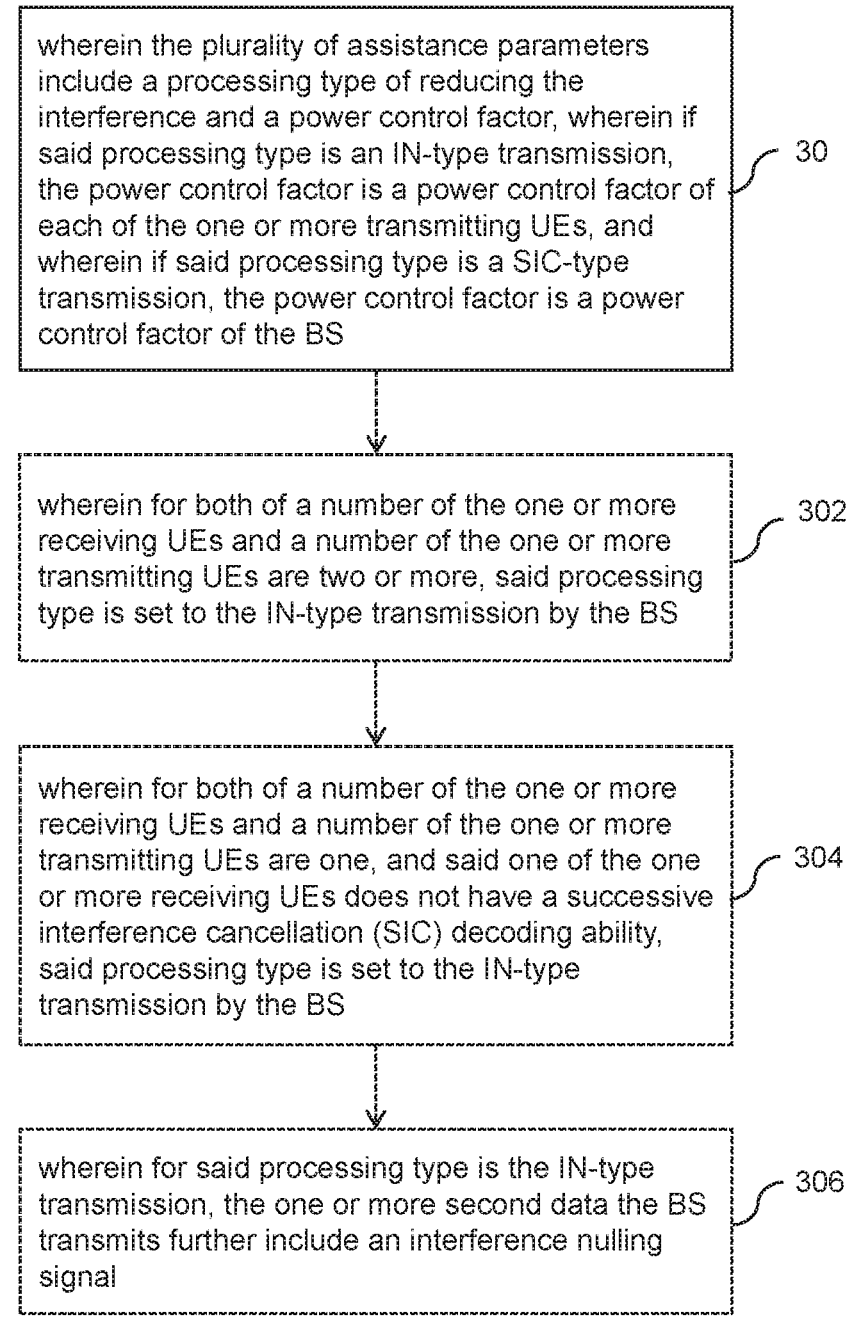
FIG. 3 shows other operating flows of a data transmission method for performing full-duplex communications in accordance with other exemplary embodiments of the application.

FIG. 3 shows other operating flows of the data transmission method for performing full-duplex communications in accordance with exemplary embodiments of the application. In an embodiment of block 30 in FIG. 3, the plurality of assistance parameters may include a processing type of reducing the interference and a power control factor, wherein if said processing type is an IN-type transmission, the power control factor is a power control factor of each of the one or more transmitting UEs; and wherein if said processing type is a SIC-type transmission, the power control factor is a power control factor of the BS 100. In an embodiment, the processor 103 of the BS 100 is configured to set said processing type.

An embodiment is shown in block 302, wherein for both of a number of the one or more receiving UEs and a number of the one or more transmitting UEs are two or more, said processing type may be set to the IN-type transmission by the BS 100. Refer to block 304 of FIG. 3, in another embodiment, wherein for both of a number of the one or more receiving UEs and a number of the one or more transmitting UEs are one, and said one of the one or more receiving UE does not have a successive interference cancellation (SIC) decoding ability, said processing type may be set to the IN-type transmission by the BS 100.

Furthermore, in an embodiment, for said processing type is the IN-type transmission, the one or more second data the BS 100 transmits may further include an interference nulling signal (block 306 of FIG. 3).

Figure 4:
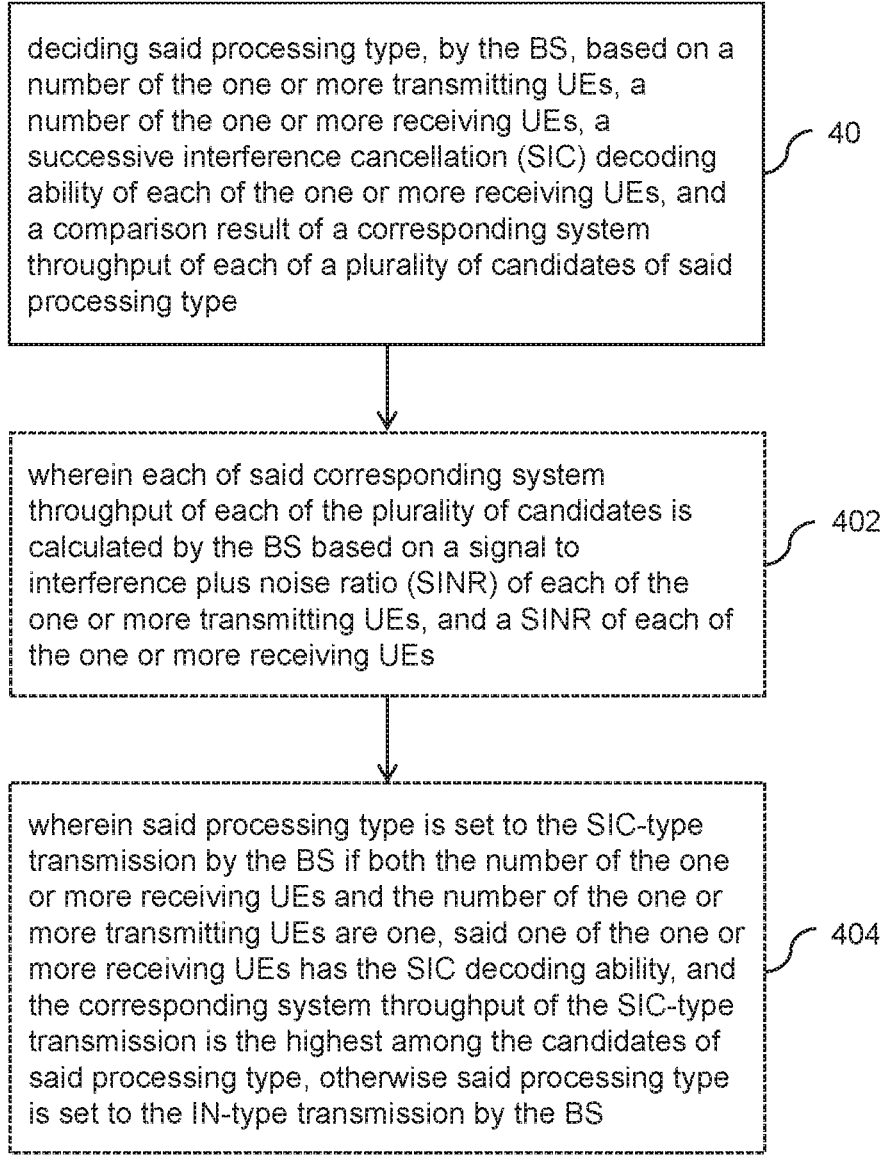
FIG. 4 shows more operating flows of a data transmission method for performing full-duplex communications in accordance with more exemplary embodiments of the application.

FIG. 4 shows more operating flows of a data transmission method for performing full-duplex communications in accordance with exemplary embodiments of the application. In an embodiment shown in block 40, the BS 100 may further decide said processing type based on a number of the one or more transmitting UEs, a number of the one or more receiving UEs, a successive interference cancellation (SIC) decoding ability of each of the one or more receiving UEs, and a comparison result of a corresponding system throughput of each of a plurality of candidates of said processing type. In an exemplary embodiment in accordance with the application, the processor 103 of the BS 100 is further configured to decide said processing type.

In an embodiment shown in block 402 of FIG. 4, each of said corresponding system throughput of each candidate of said processing type is calculated by the BS 100 respectively based on a signal to interference plus noise ratio (SINR) of each of the one or more transmitting UEs, and a SINR of each of the one or more receiving UEs. In an embodiment, the processor 103 of the BS 100 is configured to calculate said corresponding system throughput.

In another embodiment, said processing type is set to the SIC-type transmission by the BS 100 if both the number of the one or more receiving UEs and the number of the one or more transmitting UEs are one, said one of the one or more receiving UE has the SIC decoding ability, and the corresponding system throughput of the SIC-type transmission is the highest among the candidates of said processing type, otherwise said processing type is set to the IN-type transmission by the BS 100, as shown in block 404 of FIG. 4.

In the present application, the process of the BS 100 creating a nulling signal to cancel an interference out is called an interference nulling (IN). The process of the IN includes the power controlling of the transmitting UEs, the processing of receiving uplink data in the base station and the base station forwarding the received uplink data and transmitting the downlink data with power sharing. If the BS 100 decides not forwarding the received uplink data, the receiving UE will decode the uplink-to-downlink signal first and cancel it out to get a clean interference-free downlink signal, which is called a successive interference cancellation (SIC).

In an exemplary embodiment, the BS 100 may base on three conditions to choose whether to forward received uplink data or not. First, is there only single uplink and downlink client to serve? Second, is the downlink UE able to operate the SIC decoding? Third, is a system throughput of the SIC-type transmission $C_{SIC}$ greater than a system throughput of the IN-type transmission $C_{IN}$ given the channel conditions $H^U$, $H^D$ and $H^I$? Wherein, $H^U$ represents the channel strength and phase between uplink clients and the BS 100. $H^D$ represents the channel strength and phase between the BS 100 and downlink clients. $H^I$ represents the channel strength and phase between uplink clients and downlink clients. If these three conditions are true, the BS 100 decides not to forward the received uplink data. Otherwise, the BS 100 forwards the received uplink data with a processing matrix Q.

In another exemplary embodiment, after the BS making a decision, the BS transmits a transmitting message, including a processing type and a power control factor. If the processing type is an IN-type transmission, the power control factor will include each transmitting UE ID and its corresponding power control factor. If the processing type is a SIC-type transmission, the power control factor will only include the power control factor of the BS 100. With the transmitting message, every node may know how to transmit and receive and start transmission.

Figure 5:
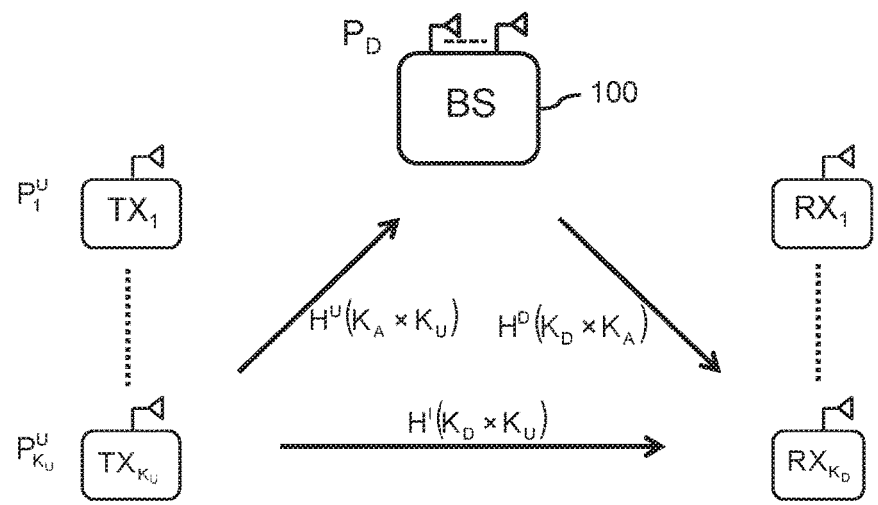
FIG. 5 shows an exemplary system model for the data transmission procedures in accordance with an exemplary embodiment of the application.

An exemplary system model is shown in FIG. 5 to explain the data transmission procedures of exemplary embodiments in accordance with the application. In the exemplary system model, the BS 100 is a full-duplex node having an antenna number $K_A \geq 1$. The system model has $K_U$ uplink transmitting UEs, $TX_1 \sim TX_{K_U}$ and $K_D$ downlink receiving UEs with single antenna, $RX_1 \sim RX_{K_D}$. And, each UE may equip multiple antennas but assume only one antenna is activated at a time. The number of the transmitting UEs $K_U \leq K_A$, and the number of the receiving UEs $K_D \leq K_A$. The maximum transmission power of each transmitting UE i is $P_i^U$ and the maximum transmission power of the BS 100 is $P_D$. $H^U$ ($K_A \times K_U$) represents the channel strength and phase between the $K_U$ transmitting UEs and the BS 100. $H^D$ ($K_D \times K_A$) represents the channel strength and phase between the BS 100 and the $K_D$ receiving UEs. $H^I$ ($K_D \times K_U$) represents the channel strength and phase between the $K_U$ transmitting UEs and the $K_D$ receiving UEs.

A base station gathers the channel strength of clients, for example the UEs, those who demand either uplink or downlink transmission. The inter-client channel strength and the channel strength between a base station and each of the clients may be recorded and updated either from latest information exchange or from initial link establishment. And, each downlink receiving UE may report message(s) to the BS 100. The message may include the receiving UE ID and the SIC decoding ability of the receiving UE. In an embodiment, the reported message may be a condition for the BS 100 being able to decide whether to forward received uplink data directly.

Because the BS 100 receives the uplink "data" (such as signal(s)/data/message(s), will also be denoted as "signal" interchangeably in the application) from a transmitting UE, the BS 100 has the ability to figure out the interference a downlink receiving UE will receive. Hence, the BS 100 may process the uplink data it received and forward to the receiving UE to cancel the interference. If the BS 100 forwards a received uplink data, the BS 100 may create a nulling signal to a receiving UE end, and this nulling signal will lead to a destructive interference with an uplink-to-downlink interference.

Figure 6:
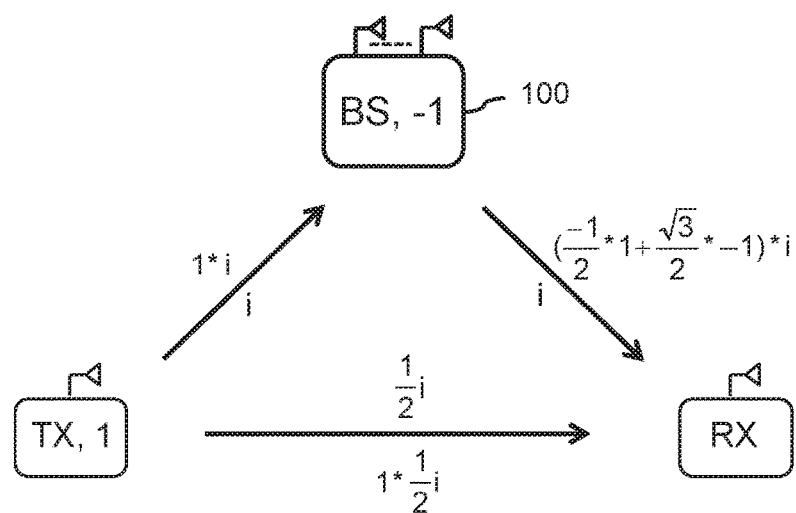
FIG. 6 shows an example to explain the creating of the nulling signal and the usage.

Here provides an simplified example to explain the creating of the nulling signal and the usage thereof. As shown in FIG. 6, the channel strength and phase $H^U$ and $H^D$ is i, and $H^I$ is ½i. The transmitting UE TX transmits its uplink data, symbol 1, to the BS 100 and this causes an uplink-to-downlink interference at the downlink receiving UE end. The BS 100 receives an uplink signal 1*i and processes it by multiplying ½*i to create a nulling signal −½ for cancelling the interference. The receiving UE RX will receive a signal 1*½i from the transmitting UE TX and receive a signal −½*i from the BS 100, thus zero is obtained by adding up these two signals. In an embodiment, except for the nulling signal, the BS 100 may also use its remaining power $$\left( e.g. \; \frac{\sqrt{3}}{2} \right)$$

to transmit its downlink data, symbol −1, to the receiving UE RX. Hence, the receiving UE RX may receive a clean downlink "data" (such as signal(s)/data/message(s), will also be denoted as "signal" interchangeably) without interference.

Figure 7:
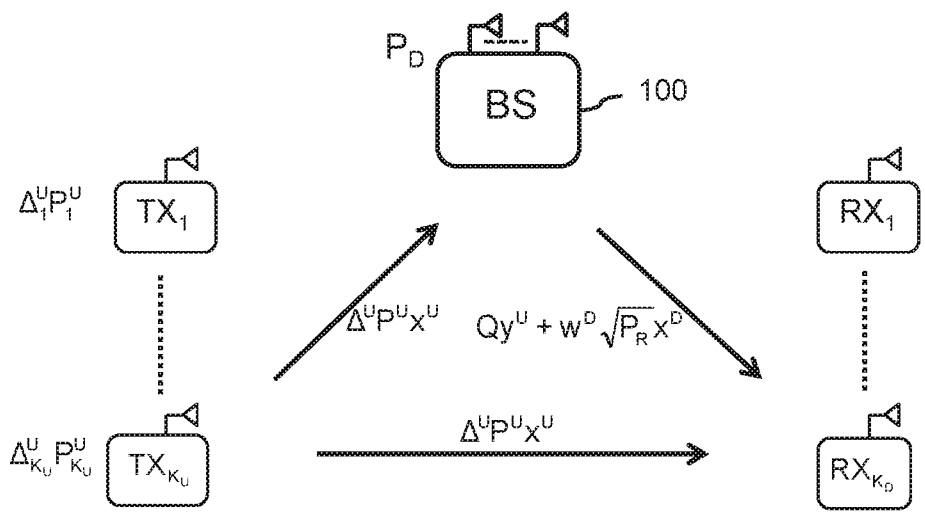
FIG. 7 shows the general transmitting data of transmitting UEs and a BS in an IN-type transmission in accordance with an exemplary embodiment of the application.

FIG. 7 shows the general transmitting data of the $K_U$ transmitting UEs and the BS 100 in an IN-type transmission in accordance with an exemplary embodiment of the application. As shown in FIG. 7, $\Delta^U P^U x^U$ is $K_U$ uplink data in a matrix form, wherein, $\Delta^U$ is a $K_U*K_U$ diagonal power control matrix representing the power control factor of each transmitting UE, $P^U$ is a $K_U*K_U$ diagonal matrix representing the maximum transmission power of each transmitting UE, and $x^U$ is a $K_U*1$ vector representing $K_U$ uplink transmitting data. Each uplink UE $U_n$ may control its power with a factor $\Delta_n^U$ in order to control the interference and keep the uplink data rate.

And $Qy^U + w^D\sqrt{P_R}x^D$ is data in a matrix form, which is transmitted by the BS 100. Wherein Q is a $K_A*K_A$ processing matrix of a signal phase and amplitude control; $y^U$ is a received uplink data by the BS 100, which equals to $H^U\Delta^U x^U + I_{self} + n_0^U$, wherein $I_{self}$ is a residual self-interference due to the full-duplex transmission at the BS 100 and $n_0^U$ is an uplink additive white Gaussian noise; $w^D$ is a $K_A*K_D$ MIMO zero-forcing beamforming matrix ($[H^D]_{row\ j}\times[w^D]_{column\ i}=0$, for each $j\neq i$) for enabling the multi-user transmission; $P_R$ is a BS remaining power, which equals to $P_D - |QH^U\Delta^U P^U x^U|^2 - \Sigma_{m=1}^{K_A}\Sigma_{n=1}^{K_A}q_{mn}^2(I_{self}+N_0)$, wherein $q_{mn}$ is a m-row, n-column element of Q; $x^D$ is a $K_D*1$ vector representing $K_D$ downlink receiving data, and $N_0$ is an additive white Gaussian noise. Because of the limitation on the transmission power of the BS 100, the nulling signal and the downlink data have to share the transmission power of the BS 100.

The power control matrix $\Delta^U$ and the processing matrix Q aim at maximizing the system throughput of the IN-type transmission $C_{IN}=\max_{Q,\Delta^U}(\Sigma_{i=1}^{K_U}R(SINR_i^U)+\Sigma_{i=1}^{K_D}R(SINR_i^D))$. Wherein $SINR_i^U$ represents the signal to interference plus noise ratio (SINR) of the uplink transmitting $UE_i$, and $SINR_i^D$ represents the SINR of the downlink receiving $UE_i$. Wherein R(SINR) is a function that set the SINR to a corresponding transmission speed, for instance it may set R(SINR) to a Shannon capacity function $B*\log 2(1+S/NR)$, while R(SINR) may be embodied in various forms without being limited to the example set forth herein.

Figure 8:
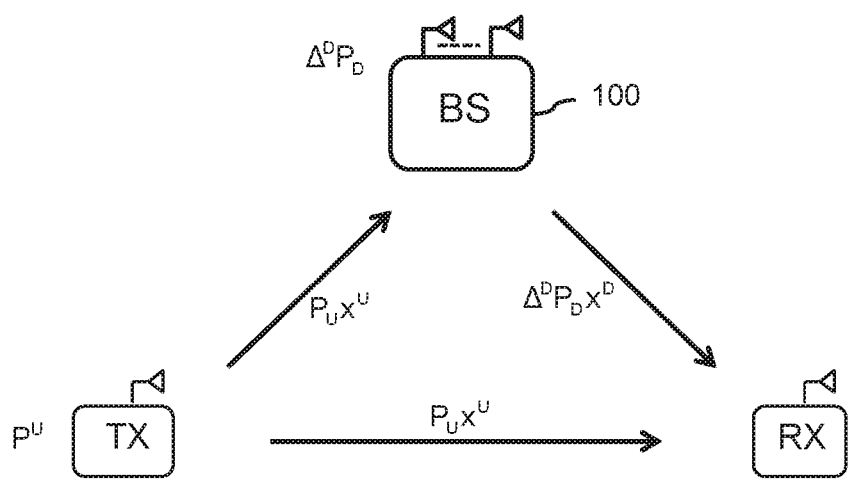
FIG. 8 shows the general transmitting data of an uplink transmitting UE and a BS in a SIC-type transmission in accordance with an exemplary embodiment of the application.

FIG. 8 shows the general transmitting data of uplink transmitting UE and the BS 100 in a SIC-type transmission in accordance with an exemplary embodiment of the application. $P^U x^U$ is the uplink transmitting data and $\Delta^D P_D x^D$ is the transmitting data of the BS 100. $\Delta^D$ is a power control factor of the BS 100, which is different from the case of the IN-type transmission where uplink clients have to control their power rather than the base station.

The power control factor $\Delta^D$ aims at maximizing the system throughput of the SIC-type transmission $$C_{SIC} = \max_{\Delta^D}(R(SINR_U^\Delta) + R(SINR_D^\Delta)).$$

Wherein $SINR_U^\Delta$ represents the SINR of the uplink transmitting UE, and $SINR_D^\Delta$ represents the SINR of the downlink receiving UE.

FIG. 9 shows more operating flows of a data transmission method for performing full-duplex communications in accordance with more exemplary embodiments of the application. In an embodiment shown in block 901 of FIG. 9, for the system throughput $C_{IN}$ of the IN-type transmission, the SINR of each of the one or more transmitting UEs and the SINR of each of the one or more receiving UEs are respectively based on the channel strength of each of the one or more transmitting UEs, the transmission power of each of the one or more transmitting UEs and the power control factor of each of the one or more transmitting UEs. And the SINR of each of the one or more receiving UEs may be further based on the processing matrix of the signal phase and amplitude control, the channel strength of each of the one or more receiving UEs, the channel strength between each of the one or more transmitting UEs and each of the one or more receiving UEs, and the transmission power of the BS 100.

In another embodiment shown in block 903 of FIG. 9, for the system throughput $C_{SIC}$ of the SIC-type transmission, the SINR of said one of the one or more transmitting UEs and the SINR of each of the one or more receiving UEs may respectively be based on a channel strength of each of the one or more transmitting UEs, a channel strength of each of the one or more receiving UEs, a channel strength between each of the one or more transmitting UEs and each of the one or more receiving UEs, and a transmission power of each of the one or more transmitting UEs.

Exemplary embodiments of the interference nulling (IN) and the successive interference cancellation (SIC) to perform the full-duplex transmission in accordance with the application are disclosed. The exemplary embodiments utilize the aforementioned IN and SIC techniques to cancel the interference or to decode the uplink signal respectively at the downlink receiving UE side to tackle the uplink-to-downlink interference.

Handling the interference properly may lead to better utilize the full-duplex technique and improve the spectrum efficiency more significantly. The application presents exemplary procedures for a base station and an uplink transmitting UE to transmit the signal in order to reduce the uplink-to-downlink interference effect as much as possible.

It is intended that the specification and examples be considered as exemplary embodiments only, with a true scope of the application being indicated by the following claims and their equivalents.

What is claimed is:

1. A data transmission method for performing full-duplex communications, comprising:
   receiving, by a base station (BS), one or more first data transmitting from at least one of one or more transmitting user equipments (UEs);
   transmitting, by the BS, a message comprising a plurality of assistance parameters for performing a full-duplex data transmission, to at least one of one or more receiving UEs, wherein the plurality of assistance parameters are associated with information of reducing an interference from the at least one of the one or more transmitting UEs; and
   transmitting, by the BS, one or more second data comprising the one or more first data to the at least one of the one or more receiving UEs;
   wherein the one or more receiving UEs and the one or more transmitting UEs respectively comprise at least one of: one or more half-duplex UEs, one or more full-duplex UEs, or any combination of two or more of the one or more half-duplex UEs and the one or more full-duplex UEs,
   wherein the plurality of assistance parameters include a processing type of reducing said interference, and wherein the processing type indicates an IN-type transmission or a SIC-type transmission.

2. The data transmission method of claim 1, wherein the plurality of assistance parameters further include a power control factor, wherein if said processing type is the IN-type transmission, the power control factor is a power control factor of each of the one or more transmitting UEs, and wherein if said processing type is the SIC-type transmission, the power control factor is a power control factor of the BS.

3. The data transmission method of claim 2, wherein for both of a number of the one or more receiving UEs and a number of the one or more transmitting UEs are two or more, said processing type is set to the IN-type transmission by the BS.

4. The data transmission method of claim 2, wherein for both of a number of the one or more receiving UEs and a number of the one or more transmitting UEs are one, and said one of the one or more receiving UEs does not have a successive interference cancellation (SIC) decoding ability, said processing type is set to the IN-type transmission by the BS.

5. The data transmission method of claim 2, wherein for said processing type is the IN-type transmission, the one or more second data the BS transmits further include an interference nulling signal.

6. The data transmission method of claim 2, further comprising:
deciding said processing type, by the BS, based on a number of the one or more transmitting UEs, a number of the one or more receiving UEs, a successive interference cancellation (SIC) decoding ability of each of the one or more receiving UEs, and a comparison result of a corresponding system throughput of each of a plurality of candidates of said processing type.

7. The data transmission method of claim 6, wherein said corresponding system throughput of each of the plurality of candidates is calculated by the BS based on a signal to interference plus noise ratio (SINR) of each of the one or more transmitting UEs, and a SINR of each of the one or more receiving UEs.

8. The data transmission method of claim 7, wherein for said processing type is the IN-type transmission, the SINR of each of the one or more transmitting UEs and the SINR of each of the one or more receiving UEs are respectively based on a channel strength of each of the one or more transmitting UEs, a transmission power of each of the one or more transmitting UEs and the power control factor of each of the one or more transmitting UEs, and the SINR of each of the one or more receiving UEs is further based on a processing matrix of a signal phase and amplitude control, a channel strength of each of the one or more receiving UEs, a channel strength between each of the one or more transmitting UEs and each of the one or more receiving UEs, and a transmission power of the BS.

9. The data transmission method of claim 6, wherein said processing type is set to the SIC-type transmission by the BS if both the number of the one or more receiving UEs and the number of the one or more transmitting UEs are one, said one of the one or more receiving UEs has the SIC decoding ability, and the corresponding system throughput of the SIC-type transmission is a highest among the plurality of candidates of said processing type, otherwise said processing type is set to the IN-type transmission by the BS.

10. The data transmission method of claim 9, wherein said corresponding system throughput of each of the plurality of candidates is calculated by the BS based on a signal to interference plus noise ratio (SINR) of said one of the one or more transmitting UEs, and a SINR of said one of the one or more receiving UEs.

11. The data transmission method of claim 10, wherein for said processing type is the SIC-type transmission, the SINR of said one of the one or more transmitting UEs and the SINR of each of the one or more receiving UEs are respectively based on a channel strength of each of the one or more transmitting UEs, a channel strength of each of the one or more receiving UEs, a channel strength between each of the one or more transmitting UEs and each of the one or more receiving UEs, and a transmission power of each of the one or more transmitting UEs.

12. A base station (BS) for performing full-duplex communications, comprising:
a transceiver unit, comprising one or more antennas, and configured for transmitting and receiving; and
a processor coupled to the transceiver unit, and configured to:
receiving, via the transceiver unit, one or more first data transmitting from at least one of one or more transmitting user equipments (UEs)
transmitting, via the transceiver unit, a message comprising a plurality of assistance parameters for performing a full-duplex data transmission, to at least one of one or more receiving UEs, wherein the plurality of assistance parameters are associated with information of reducing an interference from the one or more transmitting UEs; and
transmitting, via the transceiver unit, one or more second data comprising the one or more first data, to the at least one of the one or more receiving UEs,
wherein the one or more receiving UEs and the one or more transmitting UEs respectively comprise at least one of: one or more half-duplex UEs, one or more full-duplex UEs, or any combination of two or more of the one or more half-duplex UEs and the one or more full-duplex UEs,
wherein the plurality of assistance parameters include a processing type of reducing said interference, and wherein the processing type indicates an IN-type transmission or a SIC-type transmission.

13. The base station of claim 12, wherein the plurality of assistance parameters further include a power control factor, wherein if said processing type is the IN-type transmission, the power control factor is a power control factor of each of the one or more transmitting UEs, and wherein if said processing type is the SIC-type transmission, the power control factor is a power control factor of the BS.

14. The base station of claim 13, wherein for both of a number of the one or more receiving UEs and a number of the one or more transmitting UEs are two or more, said processing type is set to the IN-type transmission by the processor.

15. The base station of claim 13, wherein for both of a number of the one or more receiving UEs and a number of the one or more transmitting UEs are one, and said one of the one or more receiving UEs does not have a successive interference cancellation (SIC) decoding ability, said processing type is set to the IN-type transmission by the processor.

16. The base station of claim 13, wherein for said processing type is the IN-type transmission, the one or more second data the BS transmits further include an interference nulling signal.

17. The base station of claim 13, wherein the processor is further configured to:
decide said processing type based on a number of the one or more transmitting UEs, a number of the one or more receiving UEs, a successive interference cancellation (SIC) decoding ability of each of the one or more receiving UEs, and a comparison result of a corresponding system throughput of each of a plurality of candidates of said processing type.

18. The base station of claim 17, wherein said corresponding system throughput of each of the plurality of candidates is calculated by the processor respectively based on a signal to interference plus noise ratio (SINR) of each of the one or more transmitting UEs, and a SINR of each of the one or more receiving UEs.

19. The base station of claim 18, wherein for said processing type is the IN-type transmission, the SINR of each of the one or more transmitting UEs and the SINR of each of the one or more receiving UEs are respectively based on a channel strength of each of the one or more transmitting UEs, a transmission power of each of the one or more transmitting UEs and the power control factor of each of the one or more transmitting UEs, and the SINR of each of the one or more receiving UEs is further based on a processing matrix of a signal phase and amplitude control, a channel strength of each of the one or more receiving UEs, a channel strength between each of the one or more transmitting UEs and each of the one or more receiving UEs, and a transmission power of the BS.

20. The base station of claim 17, wherein said processing type is set to the SIC-type transmission by the processor if both the number of the one or more receiving UEs and the number of the one or more transmitting UEs are one, said one of the one or more receiving UEs has the SIC decoding ability, and the corresponding system throughput of the SIC-type transmission is a highest among the candidates of said processing type, otherwise said processing type is set to the IN-type transmission by the processor.

21. The base station of claim 20, wherein said corresponding system throughput of each of the plurality of candidates is calculated by the processor based on a signal to interference plus noise ratio (SINR) of said one of the one or more transmitting UEs, and a SINR of said one of the one or more receiving UEs.

22. The base station of claim 21, wherein for said processing type is the SIC-type transmission, the SINR of said one of the one or more transmitting UEs and the SINR of each of the one or more receiving UEs are respectively based on a channel strength of each of the one or more transmitting UEs, a channel strength of each of the one or more receiving UEs, a channel strength between each of the one or more transmitting UEs and each of the one or more receiving UEs, and a transmission power of each of the one or more transmitting UEs.

* * * * *